(12) United States Patent
Mochizuki

(10) Patent No.: US 6,371,050 B1
(45) Date of Patent: Apr. 16, 2002

(54) PET ANIMAL BODY WASTE TREATING MATERIAL

(75) Inventor: Isao Mochizuki, Shizuoka (JP)

(73) Assignee: Million Co., Ltd., Shizuoka-Ken (JP)

( * ) Notice: Subject to any disclaimer, the term of this patent is extended or adjusted under 35 U.S.C. 154(b) by 0 days.

(21) Appl. No.: 09/531,603

(22) Filed: Mar. 20, 2000

(30) Foreign Application Priority Data

Mar. 19, 1999 (JP) .......................................... 11-076898

(51) Int. Cl.⁷ .............................................. A01K 1/015
(52) U.S. Cl. ...................................................... 119/172
(58) Field of Search ................................. 119/172, 173

(56) References Cited

U.S. PATENT DOCUMENTS 5,836,262 A * 11/1998 Yasukawa ................... 119/173
5,972,509 A * 10/1999 Ito ........................... 119/172 X

* cited by examiner

Primary Examiner—Robert P. Swiatek
(74) Attorney, Agent, or Firm—Sughrue Mion, PLLC

(57) ABSTRACT

A pet animal body waste treating material which enables disposal of pet animal body waste, such as urine, mollock or so forth, in a similar manner as household combustible waste, and which can be manufactured easily at low material cost, can maintain satisfactorily a large total water absorption area while forming relatively small block with only a portion absorbing water, and thus is quite economical. The pet animal body waste treating material is composed of a core portion, in which paper powder, powdered bentonite and water absorbing polymer are mixed, and a surface layer portion coating the core portion, and wherein in the surface layer portion paper powder, powdered bentonite, carboxymethyl cellulose and starch are mixed.

5 Claims, No Drawings

PET ANIMAL BODY WASTE TREATING MATERIAL

BACKGROUND OF THE INVENTION

1. Field of the Invention

The present invention relates to a pet animal body waste treating material for transforming pet animal body waste, such as urine and/or mollock (feces or solid waste ejected from the body of a live animal such as a dog, cat, and the like) into combustible waste.

2. Description of the Related Art

Conventionally, there have been proposed various pet animal body waste treatments such as disposal of used body waste treating materials by flushing down the toilet irrespective of material thereof, or by separating out combustible waste and non-combustible waste to dispose like household rubbish.

Generally, a material to be used as a material of the pet animal body waste treating material, namely, ash content, such as bentonite, carboxymethyl cellulose (CMC), water absorbing polymer and so forth, are respectively 83.5 to 87.5%, 19.7% and 40.0%, and paper powder, particularly, ash content of a paper tube which will be discussed later, is 4.5%.

Therefore, pet animal body waste treating materials consisting of only bentonite have too much ash content and thus cannot be disposed as combustible waste. In contrast, pet animal body waste treating material made of paper for disposal as combustible waste, incurs higher material cost in comparison with that made of bentonite. Furthermore, in order to preventing flying out, the grain size of the individual treating material has to be as large as 5 to 10 mm to form a larger gap between the individual grains to make the water absorbing surface area small relative to bulk size. Accordingly, while water absorbing ability is insufficient, large block may be formed by absorption of water to require disposal of large block and thus is not economical.

SUMMARY OF THE INVENTION

The present invention has been worked out in view of the problems in the prior art set forth above. Therefore, it is an object of the present invention to provide a pet animal body waste treating material which enables disposal of pet animal body waste, such as urine, mollock or so forth, in a similar manner as household combustible waste, and which can be manufactured easily at low material cost, can satisfactorily maintain a large total water absorption area while forming relatively small block with only a portion absorbing water, and thus is quite economical.

According to one aspect of the present invention, a pet animal body waste treating material composed of a core portion, in which paper powder, powdered bentonite and water absorbing polymer are mixed, a surface layer portion coating the core portion and in which paper powder, powdered bentonite, carboxymethyl cellulose and starch are mixed.

Preferably, a mixture ratio of the paper powder, the powder state bentonite and the water absorbing polymer is 50 to 80 wt % of the paper powder, 20 to 50 wt % of the powdered bentonite and 1 to 10 wt % of water absorbing polymer, and a mixture ratio of the paper powder, the powdered bentonite, carboxymethyl cellulose and starch is 5 to 30 wt % of the paper powder, 50 to 90 wt % of bentonite, 1 to 20 wt % of carboxymethyl cellulose and 1 to 20 wt % of starch.

The grain size is 2 to 6 mm and ash content after burning may be less than or equal to 50%. The paper powder may be prepared from a paper tube as a core tube to be used for rolling a lengthy web for newspaper or so forth. Comparing the grain having the grain size of 2 to 6 mm and the fine grain having the grain size less than 2 mm in equal value in an aggregate, the fine grain is not suitable to use as the animal body waste treatment material since it has greater surface area than the former and thus can leave more than or equal to 50% of ash content as burnt in a manner similar to general household waste.

The paper powder may be prepared through a coarse crushing step by a hammer crusher type crusher and a fine crushing step by a cutter type crusher.

If the paper powder of about 1 mm required in the present invention is to be prepared by a repetitive process using only a hammer crusher type crusher and a cutter type crusher, crushing cannot be efficiently performed since the paper tube contains adhesive, such as polyvinyl acetate emulsion adhesive which would increase manufacturing cost.

Furthermore, the paper powder prepared using only hammer crusher type crusher, for example, has relatively high scuffing of fiber due to the presence of polyvinyl acetate emulsion adhesive. However, scuffing of the paper fiber inherently promotes intertwining or clumping to make it difficult to uniformly mix with other powder, namely, powdered bentonite, water absorbing polymer, starch or so forth Static charge is also a factor which should be considered.

A paper tube to be used for rolling a lengthy substance, such as a web for newspaper is, at first, coarsely crushed in coarse crushing step into a paper piece of about 10 cm$^2$ by a hammer crusher type crusher at a first stage and crushed into paper piece of the size about one tenth of the paper piece crushed in the first stage, at a second stage. Then, the paper piece is subject to a fine crushing step to form a paper powder of about 1 mm diameter by a cutter type crusher.

The paper powder thus obtained has extremely small scuffing of fiber and may not intertwine or clump. This facilitates uniform mixing of the paper powder with the powdered bentonite, the water absorbing polymer, starch or so froth.

By this, static charge which can be caused easily in mixing respective powders in dry condition as in the prior art, can be avoided to facilitate uniform mixing with other powders.

The paper powder is a an indispensable material for providing water absorbing ability and combustion ability of the pet animal body waste treating material. In order to obtain the paper powder, it is most economical to take the paper tube, namely core tube to be used for rolling a lengthy substance, such as a web for newspaper. The paper tube is manufactured by stacking a plurality of cardboard material paper using an adhesive, such as polyvinyl acetate emulsion adhesive, forming into a tubular shape of a predetermined diameter, and adjusting the thickness to obtain the desired strength, The powdered bentonite is suitable as inexpensive material for pelletizing the paper powder. However, if the blending ratio of the powdered bentonite is too much, combustion ability of the pet animal body waste treating material of the present invention can be degraded. The inventors have studied and determined the amount of the powdered bentonite to be blended in the pet animal body waste treating material under the premise that when ash content after burning is less than or equal to 50%, such waste can be disposed of as the general household combustible waste. As a result, preferred content is found that the powdered bentonite and the water absorbing polymer is 50 to 80 wt % of the paper powder, 20 to 50 wt % of the powdered bentonite and 1 to 10 wt % of water absorbing polymer in the mixture of the core portion, and the powder state bentonite, carboxymethyl cellulose and starch is 5 to 30 wt % of the paper powder, 50 to 90 wt % of powdered bentonite, 1 to 20 wt % of carboxymethyl cellulose and 1 to 20 wt % of starch in the surface layer portion.

On the other hand, since the pet animal body waste treating material according to the present invention takes the paper tube as material of the paper powder, polyvinyl acetate plastic is inherently contained therein. This degrades water absorbing ability.

However, due to small scuffing of fiber of the paper powder, binding between fiber in the grain is weak which easily causes swelling in the powdered bentonite and water absorbing polymer when contacted with moisture.

When forming block by aggregating the adjacent grains as by contacting with moisture, caking ability is not high since only powdered bentonite and the water absorbing polymer react. However, since the paper powder is contained in the surface layer portion, the paper powder also causes swelling with penetration into the powdered bentonite and the starch which promotes bonding of adjacent grains to form a kind of binding structure for maintaining strong caking ability for a long period after contacting with the moisture.

In order to balance and enhance the foregoing effects, the paper powder in the surface layer portion has to have lower binding ability and lower density than that of the paper powder in the core portion. To achieve this, the grain has double layer structure consisting of the core portion and the surface layer portion. Further 50 to 80 wt % of paper powder is provided in the core portion and 5 to 30 wt % of the paper powder is provided in the surface layer portion.

BEST MODE FOR IMPLEMENTING THE INVENTION

Example 1

A paper tube to be used for rolling a lengthy substance, such as a web for newspaper is coarsely crushed in coarse crushing step into a paper piece of about 10 $cm^2$ by a hammer crusher type crusher at a first stage and crushed into paper piece of the size about one tenth of the paper piece crushed in the first stage, at a second stage. Then, the paper piece is subject to a fine crushing step to form a paper powder of about 1 mm diameter by a cutter type crusher.

The paper powder thus obtained has extremely small scuffing of fiber and may not intertwine.

In the paper powder, powdered bentonite and water absorbing polymer are mixed in a ratio of 70%, 20% and 10%, respectively. The mixed powdery material is formed into grains by a known pelletizing method, Namely, for example, seeds of grain are formed by pouring a predetermined amount of water into a predetermined amount of mixed powdery material. The seeds of grain are dropped on a rotating disk to fly outwardly by centrifugal force and only those which pass through a gap between the rotary disk and the peripheral wall are collected to obtain a the necessary amount for the core portions.

To the necessary amount for the core portions, a polyvinyl alcohol (PVA) solution is sprayed. Thereafter, paper powder, powder state bentonite, CMC and starch are mixed in a ratio of 30%, 50%, 10% and 10%, respectively, to form a mixture material. The mixture material thus formed is mixed with the core portions to coat the core portions with a surface layer portion consisting of the mixture of the paper powder, powdered bentonite, CMC and starch to form necessary amount of grains.

The grains thus formed are dried appropriately and are filtered to collect grains having grain size of 2 to 6 mm.

Example 2

A mixture ratio of paper powder, powdered bentonite and water absorbing polymer in the core portion is paper powder 50 wt %, powdered bentonite 49 wt % and water absorbing polymer 1 wt %. On the other hand, the mixture ratio of the paper powder, the powdered bentonite, CMC and starch in the surface layer portion is power powder 30 wt %, powdered bentonite 58 wt %, CMC 10 wt % and starch 2 wt % to obtain necessary amount of product in the same manner as that of the example 1.

Example 3

A mixture ratio of paper powder, powder state bentonite and water absorbing polymer in the core portion is paper powder 50 wt %, powdered bentonite 35 wt % and water absorbing polymer 5 wt %. On the other hand, the mixture ratio of the paper powder, the powdered bentonite, CMC and starch in the surface layer portion is power powder 10 wt %, powdered bentonite 83 wt %, CMC 3 wt % and starch 4 wt % to obtain necessary amount of product in the same manner as that of the example 1.

As set forth above, since the pet animal body waste treating material according to the present invention is formed by coating the core portion formed by mixing the paper powder, the powdered bentonite and the water absorbing polymer, with the surface layer portion formed by mixing the paper powder, the powdered bentonite, CMC and starch, when the surface layer portion contacts with moisture, the bentonite and water absorbing polymer cause swelling easily. Since the paper powder is contained in the surface layer portion, the paper powder also causes swelling with penetrating into the powdered bentonite and the starch which promotes bonding of adjacent grains to form a kind of binding structure for maintaining strong caking ability for a long period after contacting with the moisture.

By containing 50 to 80 wt % of paper powder in the core portion and containing 5 to 30 wt % of paper powder in the surface layer portion, the foregoing effect can be more significant since binding force between the fibers of the paper powder in the surface layer is smaller and density of the fibers is lower in comparison with those in the core portion.

Since the grain side of the grains is in a range of 2 to 6 mm, residual ash component becomes less than or equal to 50%, and it becomes possible to dispose of the pet animal body waste in a similar manner as the household combustible waste.

Since the paper tube as tubular core to be used for rolling lengthy substance, such as web for newspaper, is taken as material for the paper powder, the paper powder can be easily manufactured at low material cost. Furthermore, since the paper powder has large total water absorbing surface area, sufficient water absorbing ability can be maintained so that, after absorbing moisture, only the portion absorbing the moisture can be formed into small block to provide a quite economical pet animal body waste treating material.

Since the paper powder is produced through the coarse crushing step employing the hammer crusher type crusher and the fine crushing state employing the cutter type crusher, the paper powder thus obtained has extremely small scuffing of fiber and may not intertwine. Furthermore, uniform mixing of the paper powder with other powder, such as powdered bentonite, water absorbing polymer, starch or so forth can be performed easily. By this, static charge which can be caused easily in mixing respective powders in dry condition as in the prior art, can be avoided to facilitate uniform mixing with other powders.

Although the present invention has been illustrated and described with respect to exemplary embodiments thereof, it should be understood by those skilled in the art that the foregoing and various changes, omissions and additions may be made, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A pet animal body waste treating material composed of a core portion, and a surface layer portion coating said core portion, wherein said core portion comprises a mixture of paper powder, powdered bentonite and a water absorbing polymer, and wherein said surface layer portion comprises a mixture of paper powder, powdered bentonite, carboxymethyl cellulose and starch.

2. The pet animal body waste treating material as set forth in claim 1, wherein the core portion comprises a mixture ratio of 50 to 80 wt % of the paper powder, 20 to 50 wt % of the powdered bentonite and 1 to 10 wt % of the water absorbing polymer, and the surface layer portion comprises a mixture ratio of 5 to 30 wt % of the paper powder, 50 to 90 wt % of bentonite, 1 to 20 wt % of carboxymethyl cellulose and 1 to 20 wt % of starch.

3. The pet animal body waste treating material as set forth in claim 1, wherein a grain size is 2 to 6 mm and ash content after burning is less than or equal to 50%.

4. The pet animal body waste treating material as set forth in claim 1, wherein said paper powder is prepared from a paper core tube used for rolling a lengthy web for newspaper.

5. The pet animal body treating material as set forth in claim 1, wherein said paper powder is prepared by a coarse crushing step using a hammer crusher followed by a fine crushing step using a cutter crusher.

* * * * *